(12) United States Patent
Weng et al.

(10) Patent No.: US 11,506,843 B1
(45) Date of Patent: Nov. 22, 2022

(54) SEMICONDUCTOR DEVICE HAVING PHOTONIC AND ELECTRONIC DIES AND AN OPTICAL FIBER ASSEMBLY CREATING AN AIR GAP

(71) Applicant: Taiwan Semiconductor Manufacturing Company, Ltd., Hsinchu (TW)

(72) Inventors: Chung-Ming Weng, Hsinchu (TW); Chen-Hua Yu, Hsinchu (TW); Chung-Shi Liu, Hsinchu (TW); Hao-Yi Tsai, Hsinchu (TW); Cheng-Chieh Hsieh, Tainan (TW); Hung-Yi Kuo, Taipei (TW); Che-Hsiang Hsu, Hsinchu (TW); Chewn-Pu Jou, Hsinchu (TW); Feng-Wei Kuo, Hsinchu County (TW); Min-Hsiang Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 28 days.

(21) Appl. No.: 17/319,103

(22) Filed: May 13, 2021

(51) Int. Cl.
G02B 6/36 (2006.01)
G02B 6/26 (2006.01)

(52) U.S. Cl.
CPC .......... G02B 6/3628 (2013.01); G02B 6/262 (2013.01)

(58) Field of Classification Search
CPC .............................. G02B 6/3628; G02B 6/262
See application file for complete search history.

(56) References Cited

U.S. PATENT DOCUMENTS

| | | | |
|---|---|---|---|
| 10,892,845 B2* | 1/2021 | Peterson | H04B 10/40 |
| 2003/0113074 A1* | 6/2003 | Kohlstadt | G02B 6/266 385/88 |
| 2019/0033528 A1* | 1/2019 | Ootorii | G02B 6/02 |
| 2020/0057218 A1* | 2/2020 | Islam | G02B 6/4269 |
| 2020/0162185 A1* | 5/2020 | Peterson | H04J 14/0256 |
| 2021/0132309 A1* | 5/2021 | Zhang | H01L 24/19 |
| 2021/0329810 A1* | 10/2021 | Goergen | G02B 6/4269 |
| 2022/0037566 A1* | 2/2022 | Chen | H01L 31/0203 |
| 2022/0231005 A1* | 7/2022 | Pan | H01L 23/3121 |

* cited by examiner

*Primary Examiner* — Andrew Jordan
(74) *Attorney, Agent, or Firm* — JCIPRNET

(57) ABSTRACT

A semiconductor device including a singulated structure and an optical fiber assembly is provided. The singulated structure includes a photonic die, an electronic die connected to the photonic die and an optical element over the photonic die. The optical fiber assembly is disposed on a top of the singulated structure and includes a holder and an optical fiber structure. The holder keeps an air gap from the optical element. The optical fiber structure is carried by the holder and configured to be optically communicated with the photonic die through the optical element.

20 Claims, 13 Drawing Sheets

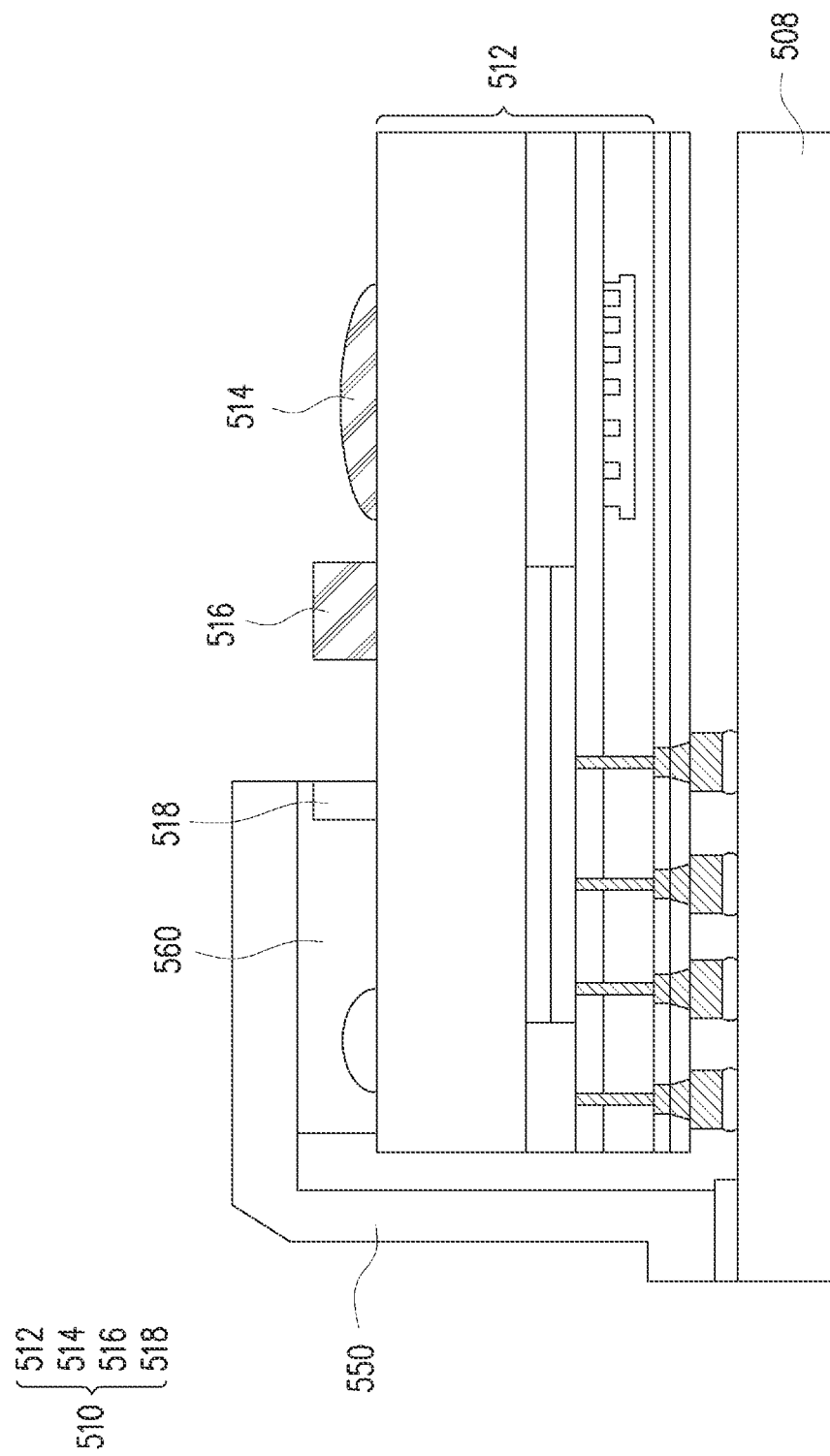

SEMICONDUCTOR DEVICE HAVING PHOTONIC AND ELECTRONIC DIES AND AN OPTICAL FIBER ASSEMBLY CREATING AN AIR GAP

BACKGROUND

The semiconductor industry has experienced rapid growth due to continuous improvements in the integration density of a variety of circuit components (e.g., transistors, diodes, resistors, capacitors, etc.). For the most part, this improvement in integration density has come from repeated reductions in minimum feature size, which allows more components to be integrated into a given area. Currently, System-on-Integrated-Circuit (SoIC) components are becoming increasingly popular for their multi-functions and compactness.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A through FIG. 5F schematically illustrate a portion of the process of fabricating a semiconductor device in accordance with some embodiments.

DETAILED DESCRIPTION

Figure 1A:
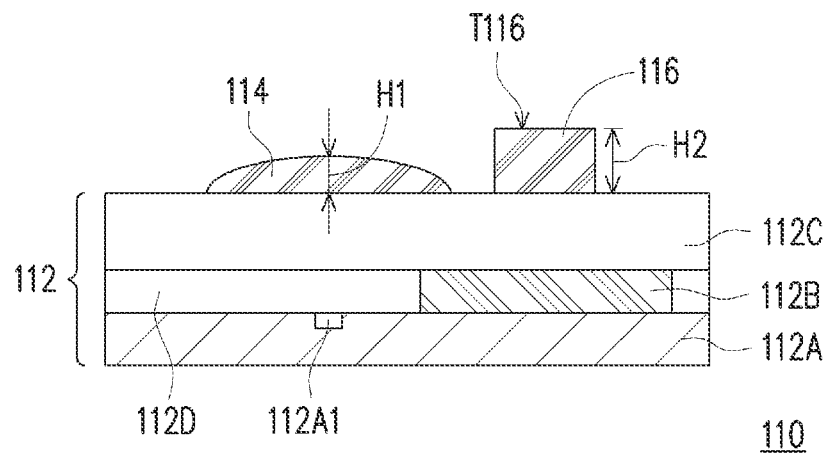
FIG. 1A and FIG. 1B schematically illustrate the process of attaching an optical fiber assembly to a singulated structure in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

Referring to FIG. 1A, a portion of a singulated structure 110 is shown. The singulated structure 110 includes a die body 112, an optical element 114 and a raised structure 116, but not limited thereto. The die body 112 includes a photonic die 112A, an electronic die 112B, a substrate 112C and a filling layer 112D. The electronic die 112B and the filling layer 112D are disposed on the substrate 112C and the filling layer 112D laterally surrounds the electronic die 112B. The photonic die 112A is stacked on the electronic die 112B and the filling layer 112D. A portion of the photonic die 112A is not shielded by the electronic die 112B. The electronic die 112B is smaller than the photonic die 112A in the lateral size, but the disclosure is not limited thereto. In addition, in some alternative embodiments, the electronic die 112B and the photonic die 112A are optionally arranged side by side without stacking over each other.

The photonic die 112A may include any semiconductor photonic integrated circuit. For example, the photonic die 112A includes an electro-optical circuitry that integrates multiple photonic functions for optical information signals received thereby via, e.g., optical fibers. Such electro-optical circuitry is configured to converting the optical information signals to electrical signals or vice versa. In some embodiments, the photonic die 112A may include an optical waveguide system 112A1 (e.g., grating coupler or I/O waveguide), but may also include, depending on application, other components such as: a Bragg reflector, an arrayed waveguide grating or other wave guide, transistor based electronics including detectors and modulators, amplifiers, and/or an externally modulated laser diode with an electro-absorption modulator. The optical waveguide system 112A1 may include structures to guide light/signals from each optical fiber coupled thereto, individually. The electronic die 112B includes active components (e.g., transistors or the like) and passive components (e.g., resistors, capacitors, inductors, or the like) formed therein, and the electronic die 112B is electrically connected to the photonic die 112A, such that the electronic die 112B may process the electric signal converted from the optical signal by the photonic die 112A.

In some embodiments, the electronic die 112B is attached onto the substrate 112C and is smaller than the substrate 112C in lateral size. The filling layer 112D is formed to surround the electronic die 112B on the substrate 112C to provide a planarization effect. For example, the filling layer 112D may be thick enough to compensate the thickness of the electronic die 112B so that the photonic die 112A is disposed on a substantial planar surface constructed by the filling layer 112D and the electronic die 112B. In some embodiments, the material of the filling layer 112D includes oxide such as silicon oxide, but is not limited thereto.

The optical element 114 and the raised structure 116 are disposed on the substrate 112C. In some embodiments, the optical element 114 and the raised structure 116 are formed on the substrate 112C by a wafer-level process. The optical element 114 is a lens, for example, that is located over the optical waveguide system 112A1. In some embodiments, the focus of the optical element 114 is tuned so that the light beam passes through the optical element 114 can incident on the optical waveguide system 112A1 in a desirable manner. For example, the focus of the optical element 114 can be located on the optical waveguide system 112A1. The raised structure 116 is disposed beside the optical element 114. The raised structure 116 is higher than the optical element 114. In some embodiments, a maximum height H1 of the optical element 114 is smaller than a maximum height H2 of the raised structure 116 and the top T116 of the raised structure 116 is leveled higher than the maximum height H1 of the optical element 114. A material of the optical element 114 and the raised structure 116 include transparent material such as a transparent polymer that allows light transmission. In some embodiments, the raised structure 116 is formed of a material identical to the optical element 114. In addition, the substrate 112C and the filling layer 112D are also transparent.

Figure 1B:
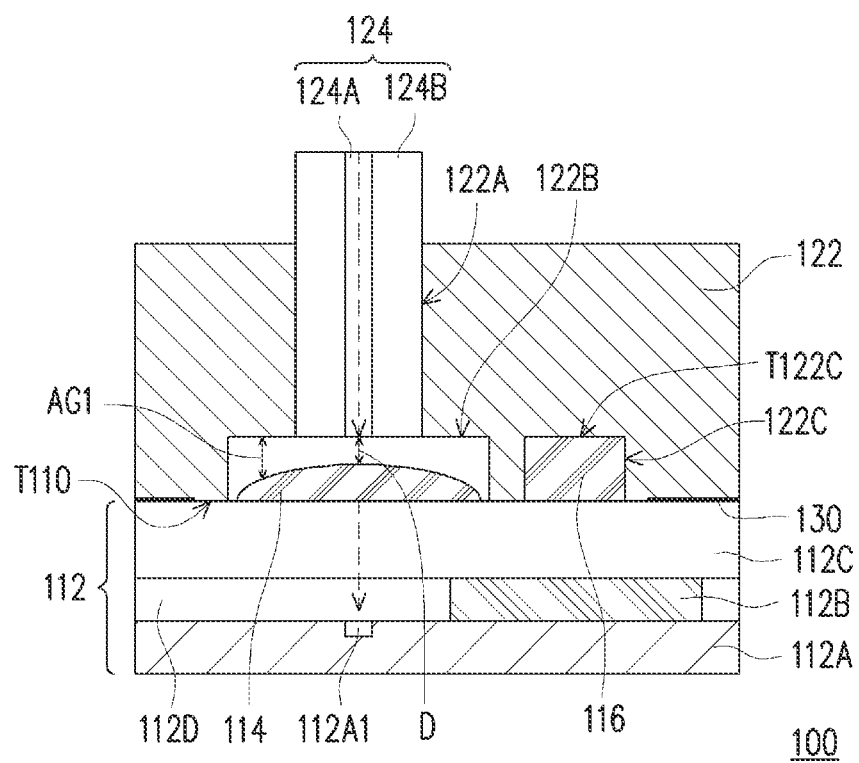

In FIG. 1B, an optical fiber assembly 120 is disposed on the top T110 of the singulated structure 110 to construct a portion of a semiconductor device 100. The optical fiber assembly 120 includes a holder 122 and an optical fiber structure 124 carried by the holder 122. The holder 122 has a through hole 122A for accommodating the optical fiber structure 124. Specifically, the through hole 122A is oriented to direct to the optical element 114 of the singulated structure 110 so that the optical fiber structure 124 inserted in the through hole 122A directs to the optical element 114.

The holder 122 carries the optical fiber structure 124 to keep the optical fiber structure 124 from the optical element 114 by a distance D. The holder 122 further has a bottom surface 122B at the bottom end of the through hole 122A and is spaced from the optical element 114 by an air gap AG1. In some embodiments, the holder 122 is attached to the singulated structure 110 without in contact with the optical element 114. The holder 122 further has a limiting portion 122C that is corresponding to the raised structure 116, such that the raised structure 116 is considered as a second limiting portion and is structurally interfered with the optical fiber assembly 120. In the embodiment, the limiting portion 122C of the holder 122 can be a recess that is adapted to accommodating the raised structure 116 that is a protrusion protruded from the singulated structure 110. The raised structure 116 can be inserted into the recess of the limiting portion 122C of the holder 122 and is complementary to the limiting portion 122C in shape.

The optical fiber structure 124 includes an optical fiber 124A and a wrapping layer 124B wrapping the optical fiber 124A and is configured to be optically communicated with the photonic die 112A through the optical element 114. The wrapping layer 124B leans against the wall of the through hole 122A and is hold by the holder 122. In addition, the optical fiber 124A is oriented to direct to the optical element 114 of the singulated structure 110. In some embodiments, light beam which carries the optical signal from the optical fiber 124A would pass through the air gap AG1, the optical element 114, the substrate 112C and the filling layer 112D in sequence prior to irradiate on the optical waveguide system 112A1 of the photonic die 112A. The photonic die 112A can convert the optical signal from the optical fiber 124A into electric signal and transmit such electric signal to the electronic die 112B.

The holder 122 of the optical fiber assembly 120 is attached to the singulated structure 110 through an adhesion 130. In some embodiments, the adhesion 130 is a temporary adhesion and is removable. For example, the adhesion 130 can be a removable adhesion that is made of a thermally and/or optically removable material. The holder 122 can be removed from the singulated structure 110 though a thermal and/or optical treatment when desires. In some embodiments, the holder 122 carrying the optical fiber structure 124 can be removed from the singulated structure 110 when the optical fiber structure 124 is broken and/or failed and the removal of the holder 122 would least likely damage the optical element 114 or the die body 112. Therefore, another optical fiber assembly 120 can be attached to the singulated structure 110 to achieve the replacement for the optical fiber assembly 120. In other words, the semiconductor device 100 is repairable by replacing the failed optical fiber assembly 120 with a new one without damaging the singulated structure 110.

Figure 2A:
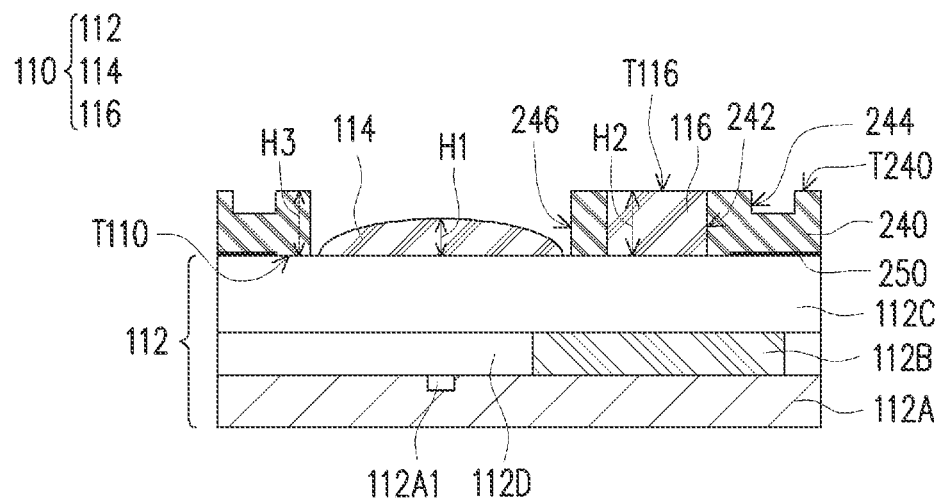
FIG. 2A and FIG. 2B schematically illustrate the process of attaching an optical fiber assembly to a singulated structure in accordance with some embodiments of the disclosure.

Referring to FIG. 2A, a socket 240 is disposed on a singulated structure 110 and the singulated structure 110 is substantially the same as the singulated structure 110 illustrated in FIG. 1A. Namely, the singulated structure 110 includes at least a die body 112, an optical element 114, and a raised structure 116. The die body 112 includes a photonic die 112A, an electronic die 112B, a substrate 112C, and a filling layer 112D. The optical element 114 is located above an optical waveguide system 112A1 of the photonic die 112A to provide an optical coupling effect. The socket 240 is attached onto the top T110 of the singulated structure 110 through an adhesion 250. In the embodiment, the adhesion 250 is difficultly removed from the singulated structure 110 so that the socket 240 can be substantially permanently attached on the singulated structure 110.

The socket 240 has various limiting portions 242 and 244. The limiting portion 242 is, for example, a through hole corresponding to the raised structure 116. Herein, the raised structure 116 is considered as a guide pin. The socket 240 is attached to the singulated structure 110 by plugging the raised structure 116 into the limiting portion 242 so that the position of the socket 240 is limited by the raised structure 116. In other words, the socket 240 is structurally interfered with the raised structure 116. The limiting portion 244 is formed on top of the socket 240 and is used as a guide structure for an overlying component. In some embodiments, the limiting portion 244 is a staggered structure on the top side of the socket 240 to provide an interfering structure for the overlying component. In addition, the socket 240 has an opening 246 corresponding to the optical element 114 on top of the singulated structure 110. The optical element 114 is located within the opening 246. In some embodiments, the maximum height H1 of the optical element 114 is smaller than the maximum height H2 of the raised structure 116 as well as the maximum height H3 of the socket 240. The highest top T240 of the socket 240 may be leveled with the top T116 of the raised structure 116, but the disclosure is not limited thereto.

Figure 2B:
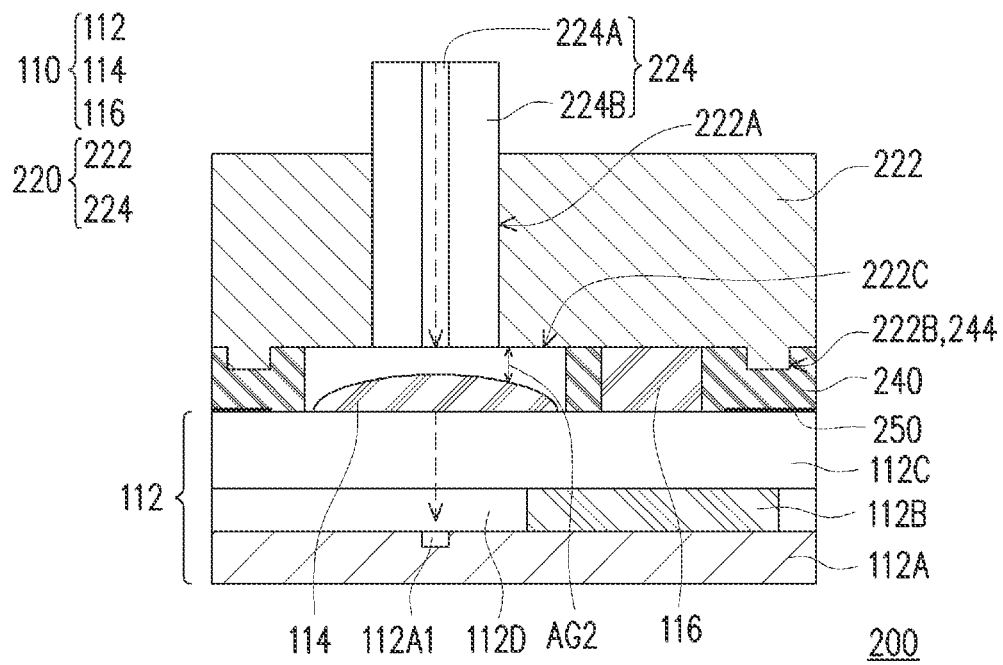

Referring to FIG. 2B, an optical fiber assembly 220 is disposed on the singulated structure 110 over the optical element 114 to form a semiconductor device 200 by leaning the optical fiber assembly 220 against the socket 240. The optical fiber assembly 220 includes a holder 222 and an optical fiber structure 224. The holder 222 carries the optical fiber structure 224 by inserting the optical fiber structure 224 into an opening 222A of the holder 222. The holder 222 stacks on the socket 240 and has a limiting portion 222B that is a structure corresponding to the limiting portion 244 of the socket 240. Specifically, the limiting portion 222B of the holder 222 is structurally interfered with the limiting portion 244 of the socket 240 so that the holder 222 is positioned at the predetermined position and orientation. The limiting portion 222B of the holder 222 is a protrusion while the limiting portion 244 of the socket 240 is a recess, but the disclosure is not limited thereto. In alternative embodiments, the limiting portion 222B of the holder 222 is a recess and the limiting portion 244 of the socket 240 is a protrusion complementary to the recess constructed by the limiting portion 222B.

The optical fiber assembly 220 is supported by the socket 240, and the socket 240 is interposed between the holder 222 and the singulated structure 110, so that the socket 240 is served as a raised structure. Through the configuration of the raised structure like socket 240, the holder 222 and the optical fiber structure 224 are leveled higher and not in contact with the optical element 114 to keep the air gap AG2 between the optical element 114 and the optical fiber assembly 220. For example, the bottom surface 222C of the holder 222 keeps an air gap AG2 from the optical element 114. In addition, for the optical fiber structure 224, an optical fiber 224A wrapped by a wrapping layer 224B is spaced from the optical element 114 by a distance without structurally touching the optical element 114. The holder 222 carrying the optical fiber assembly 224 is removable from the socket 240. In the case the optical fiber structure 224 is failed, the holder 222 carrying the optical fiber structure 224 can be detached from the socket 240 and another optical fiber assembly 220 can be provided to replace the failed one without damaging the optical element 114 or any component of the singulated structure 110.

In the semiconductor device 200, the optical fiber structure 224 is configured to be optically communicated with the photonic die 112A through the optical element 114. Specifically, a light beam from the optical fiber 224A would pass through the air gap AG2, the optical element 114, the substrate 112C and the filling layer 112D in sequence prior to irradiate on the optical waveguide system 112A1 of the photonic die 112A. The photonic die 112A can convert the optical signal carried by the light beam from the optical fiber 224A into an electric signal and transmit such electric signal to the electronic die 112B.

Figure 3A:
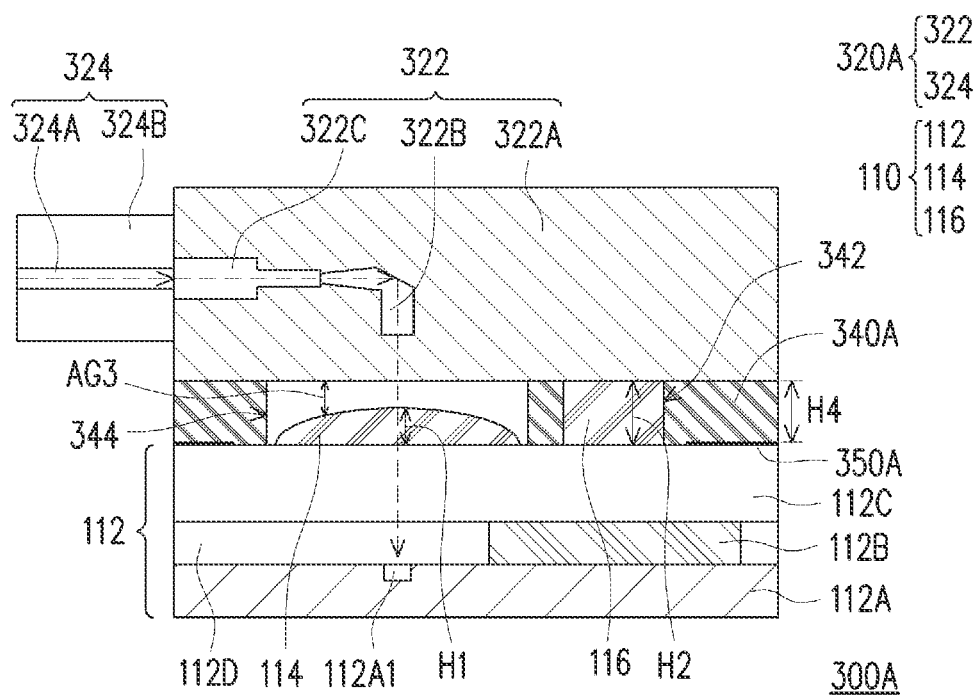
FIG. 3A schematically illustrates a semiconductor device in accordance with some embodiments of the disclosure.

FIG. 3A schematically illustrates a semiconductor device in accordance with some embodiments of the disclosure. A semiconductor device 300A in FIG. 3A includes a singulated structure 110, an optical fiber assembly 320A and a socket 340A. The singulated structure 110 is substantially the same as the singulated structure 110 illustrate in FIG. 1A and includes a die body 112, an optical element 114 and a raised structure 116. The die body 112 includes a photonic die 112A having an optical waveguide system 112A1 therein, an electronic die 112B, a substrate 112C, and a filling layer 112D. The optical element 114 is positioned above the optical waveguide system 112A1 and the raised structure 116 is located beside the optical element 114. The optical fiber assembly 320A is disposed on a top of the singulated structure 110 and the socket 340A is disposed between the singulated structure 110 and the optical fiber assembly 320A. The socket 340A is interposed between the singulated structure 110 and the optical fiber assembly 320A to separate the optical fiber assembly 320A from the optical element 114 on top of the singulated structure 110.

The optical fiber assembly 320A includes a holder 322 and an optical fiber structure 324. The holder 322 includes a housing 322A and optical components 322B and 322C. The optical components 322B and 322C are equipped in the housing 322A and supported by the housing 322A. In some embodiments, the optical component 322B is an optical prism that is able to turning and/or refracting the path of a light beam and the optical component 322C is an optical coupler that is an interface component between the optical component 322B and the optical fiber structure 324.

The optical fiber structure 324 includes an optical fiber 324A and a wrapping layer 324B wrapping the optical fiber 324A. The optical fiber structure 324 is attached to the housing 322A of the holder 322 at a lateral side of the housing 322A. The optical fiber 324A is oriented to direct to the optical component 322C equipped in the housing 322A. In addition, the optical component 322B is positioned corresponding to the optical element 114 on top of the singulated structure 110. Therefore, a light beam from the optical fiber 324A passing through the optical component 322C to the optical component 322B is refracted by the optical component 322B and travels towards the optical element 114. The light beam then passes through the air gap AG3, the optical element 114, the substrate 112C and the filling layer 112D in sequence to incident on the optical waveguide system 112A1 of the photonic die 112A. The photonic die 112A can convert the light beam from the optical fiber 324A to electric signal and transmit the converted electric signal to the electronic die 112B.

The socket 340A has a limiting portion 342 and an opening 344. The limiting portion 342 is positioned corresponding to the raised structure 116 on top of the singulated structure 110. The raised structure 116 is served as a guide pin so that the socket 340A is attached to the singulated structure 110 by aligning the limiting portion 342 of the socket 340A with the raised structure 116. For example, the raised structure 116 can be inserted into the limiting portion 342 of the socket 340A. The opening 344 is located beside the limiting portion 342 while the space relationship between the opening 344 and the limiting portion 342 is similar to that between the optical element 114 and the raised structure 116. The opening 344 is configured to accommodate and surround the optical element 114 after attaching the socket 340A onto the singulated structure 110. The opening 344 can have a lager lateral size than the optical element 114 so that the socket 340A is not in contact with the optical element 114.

In some embodiments, the maximum height H1 of the optical element 114 is smaller than the maximum height H2 of the raised structure 116 as well as the maximum height H4 of the socket 340A. The maximum height H4 of the socket 340A can be not smaller than the maximum height H2 of the raised structure 116 so that the raised structure 116 would not block the attachment of the optical fiber assembly 320A and the socket 340A. In some embodiments, the dimension of the limiting portion 342 as well as the maximum height H4 of the socket 340A can be determined to be corresponding to the size of the raised structure 116.

In some embodiments, the optical fiber assembly 320A and the socket 340A are assembled as an integral piece prior to be attached onto the singulated structure 110 through an adhesion 350A. As such, the optical fiber assembly 320A connected to the socket 340A is supported by the raised structure 116 to keep an air gap AG3 from the optical element 114. The integral piece of the optical fiber assembly 320A and the socket 340A does not in contact with the optical element 114. In addition, the integral piece of the optical fiber assembly 320A and the socket 340A is attached to the singulated structure 110 by aligning the limiting portion 342 to the raised structure 116.

In some embodiments, the adhesion 350A is a removable adhesion so that the integral piece of the optical fiber assembly 320A and the socket 340A is detachable from the singulated structure 110, which facilitates the repair of the semiconductor device 300A. In the case that one or more component of the optical fiber assembly 320A fails and/or is broken, the optical fiber assembly 320A along with the socket 340A is removed from the singulated structure 110 and another integral piece of the optical fiber assembly 320A and the socket 340A for replacing the failed piece is attached to the singulated structure 100 without damaging any component of the singulated structure 110.

Figure 3B:
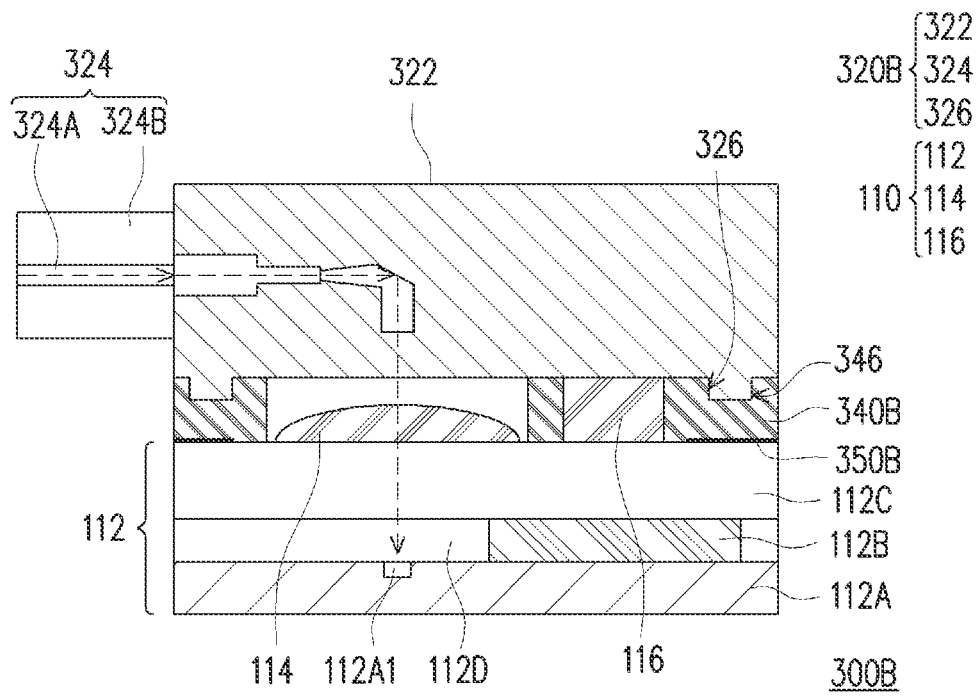
FIG. 3B schematically illustrates a semiconductor device in accordance with some embodiments of the disclosure.

A semiconductor device 300B in FIG. 3B is similar to the semiconductor device 300A and thus the same reference numbers represent the same components/elements in the two embodiments. The semiconductor device 300B includes a singulated structure 110, an optical fiber assembly 320B, and a socket 340B. In the embodiment, the singulated structure 110 is similar to the singulated structure 110 depicted in the foregoing embodiments and includes the die body 112, the optical element 114 and the raised structure 116. The socket 340 is attached to the singulated structure 110 through an adhesion 350B and is structurally interfered with the raised structure 116. The optical fiber assembly 320B is assembled to the socket 340B and includes the holder 322 and the optical fiber structure 324.

In the embodiment, the socket 340B has a limiting portion 346 on the top side and the optical fiber assembly 320B has another limiting portion 326 on the bottom side of the holder 322. The optical fiber assembly 320B is structurally interfered with the socket 340B through the limiting portion 346 and the limiting portion 326. In some embodiments, the limiting portion 326 formed on the holder 322 of the optical fiber assembly 320B is a protrusion and the limiting portion 346 formed on top of the socket 340B is a recess that is inserted by the limiting portion 346. In some other embodiments, the limiting portion 326 can be a recess and the limiting portion 346 can be a protrusion inserted into the limiting portion 326. In some embodiments, the adhesion 350B is a permanent adhesion and/or difficultly removed from the singulated structure 110 and the optical fiber assembly 320B is assembled to the socket 340B by the structural interference between the limiting portion 326 and the limiting portion 346 so that the optical fiber assembly 320B is detachable from the socket 340B to achieved a repairable design.

Figure 4:
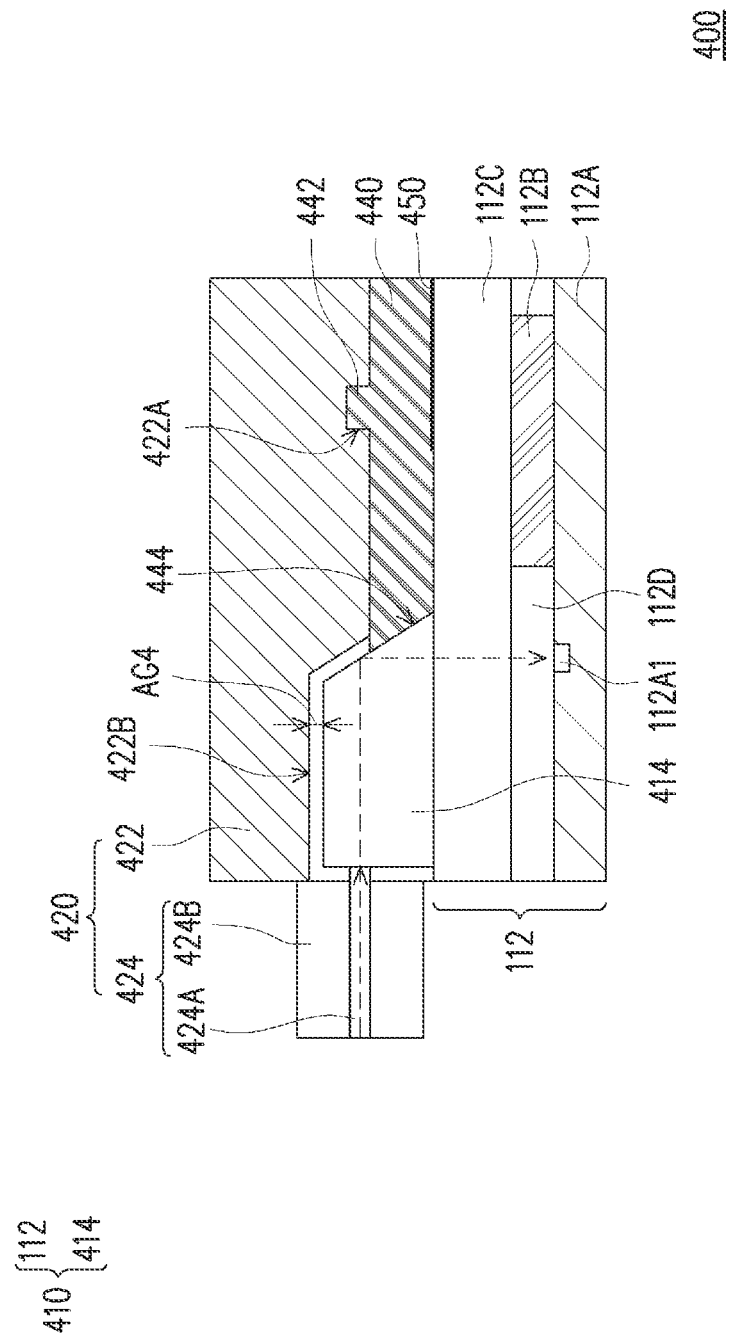
FIG. 4 schematically illustrates a semiconductor device in accordance with some embodiments of the disclosure.

Referring to FIG. 4, a semiconductor device 400 includes a singulated structure 410, an optical fiber assembly 420 and a socket 440. The singulated structure 410 includes a die body 112 and an optical element 414. The socket 440 is attached to the singulated structure 410 through an adhesion 450 and positioned beside the optical element 414. The optical fiber assembly 420 is supported by the socket 440 and keeps an air gap AG4 from the optical element 414.

The singulated structure 410 includes the die body 112 and the optical element 414. The die body 112 is substantially similar to the die body 112 described in the foregoing embodiments and includes a photonic die 112A with an optical waveguide system 112A1 therein, an electronic die 112B, a substrate 112C and a filling layer 112D. The optical element 414 in the embodiment is a prism, for example. The optical element 414 is located above the optical waveguide system 112A1 of the photonic die 112A. The optical element 414 can be formed on the die body 112 through a wafer-level process and made of a transparent material.

The socket 440 is attached onto the singulated structure 410 through the adhesion 450. In some embodiments, the adhesion 450 can be a permanent adhesion that is difficultly removed. Therefore, the socket 440 in the embodiment is not easy to be removed from the semiconductor device 400. The socket 440 has a limiting portion 442 that is a raised structure on top of the socket 440 and an opening 444 that is corresponding to the optical element 414. The opening 444 of the socket 440 surrounds the optical element 414.

The optical fiber assembly 420 includes a holder 422 and an optical fiber structure 424. The holder 422 carries the optical fiber structure 424 and is assembled to the socket 440 and keeps the air gap AG4 from the optical element 414. The holder 422 has a limiting portion 422A that is positioned corresponding to the limiting portion 442 of the socket 440. In some embodiments, one of the limiting portion 442 and the limiting portion 422A is a concave and the other is a protrusion complementary to the concave. The holder 422 carrying the optical fiber structure 424 is assembled to the singulated structure 410 by the structural interference between the limiting portion 442 and the limiting portion 422A. The holder 422 has a bottom surface 422B that is spaced from the optical element 414 by the air gap AG4 without in contact with the optical element 414.

The optical fiber structure 424 includes an optical fiber 424A and a wrapping layer 424B wrapping the optical fiber 424A. The optical fiber structure 424 is attached to the holder 422 at a lateral side of the holder 422 and the optical fiber 424A is oriented to direct to the optical element 414 on top of the singulated structure 410. A light beam from the optical fiber 424A entering the optical element 414 is refracted by the optical element 414 and travels towards the optical waveguide system 112A1 formed in the photonic die 112A. The photonic die 112A can convert the light beam from the optical fiber 424A to electric signal and transmit the converted electric signal to the electronic die 112B to access the determined function.

The holder 422 is assembled to the socket 440 in a detachable manner. In the case that one or more component of the optical fiber assembly 420 fails and/or is broken, the optical fiber assembly 420 is removed from the socket 440 and another optical fiber assembly 420 for replacing the failed one is attached to the socket 440 without damaging any component of the singulated structure 410. Therefore, the repair of the semiconductor device 40 is achieved.

Figure 5A:
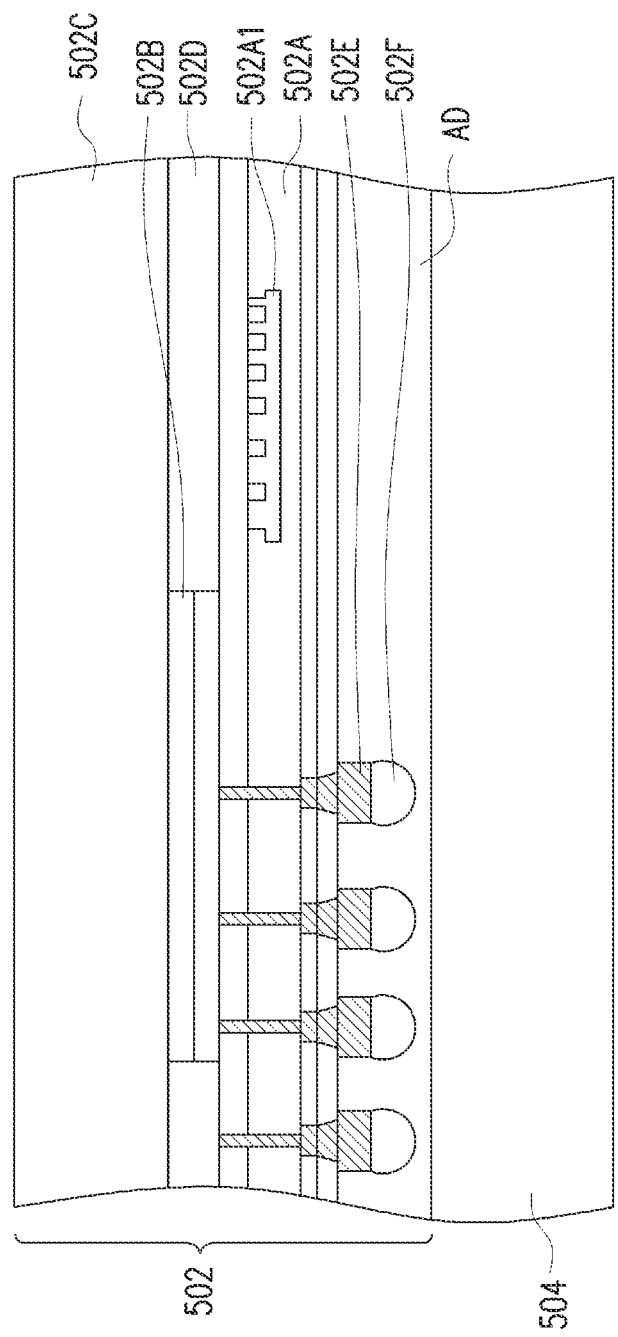

FIG. 5A through FIG. 5F schematically illustrate a portion of the process for fabricating a semiconductor device in accordance with some embodiments. In FIG. 5A, a semiconductor stack structure 502 is carried by a carrier 504. The semiconductor stack structure 502 includes a photonic wafer 502A, an electronic die 502B, a wafer substrate 502C, a filling layer 502D, a contact pad 502E, and a connector 502F. The photonic wafer 502A has an optical waveguide system 502A1 formed therein and the optical waveguide system 502A1 is positioned without being shielded by the electronic die 502B. The photonic wafer 502A and the wafer substrate 502C respectively have a wafer form and the electronic die 502B is cut from a mother wafer to have a required size. The electronic die 502B is smaller than the photonic wafer 502A and is disposed between the wafer substrate 502C and the photonic wafer 502A. The filling layer 502D is also disposed between wafer substrate 502C and the photonic wafer 502A and surrounds the electronic die 502B. The contact pad 502E is electrically connected to the electronic die 502B and is formed at a side of the photonic wafer 502A and the connector 502F is formed on the contact pad 502E for connecting to another component. In some embodiments, the semiconductor stack structure 502 is attached temporarily onto the carrier 504 through an adhesion AD.

Figure 5B:
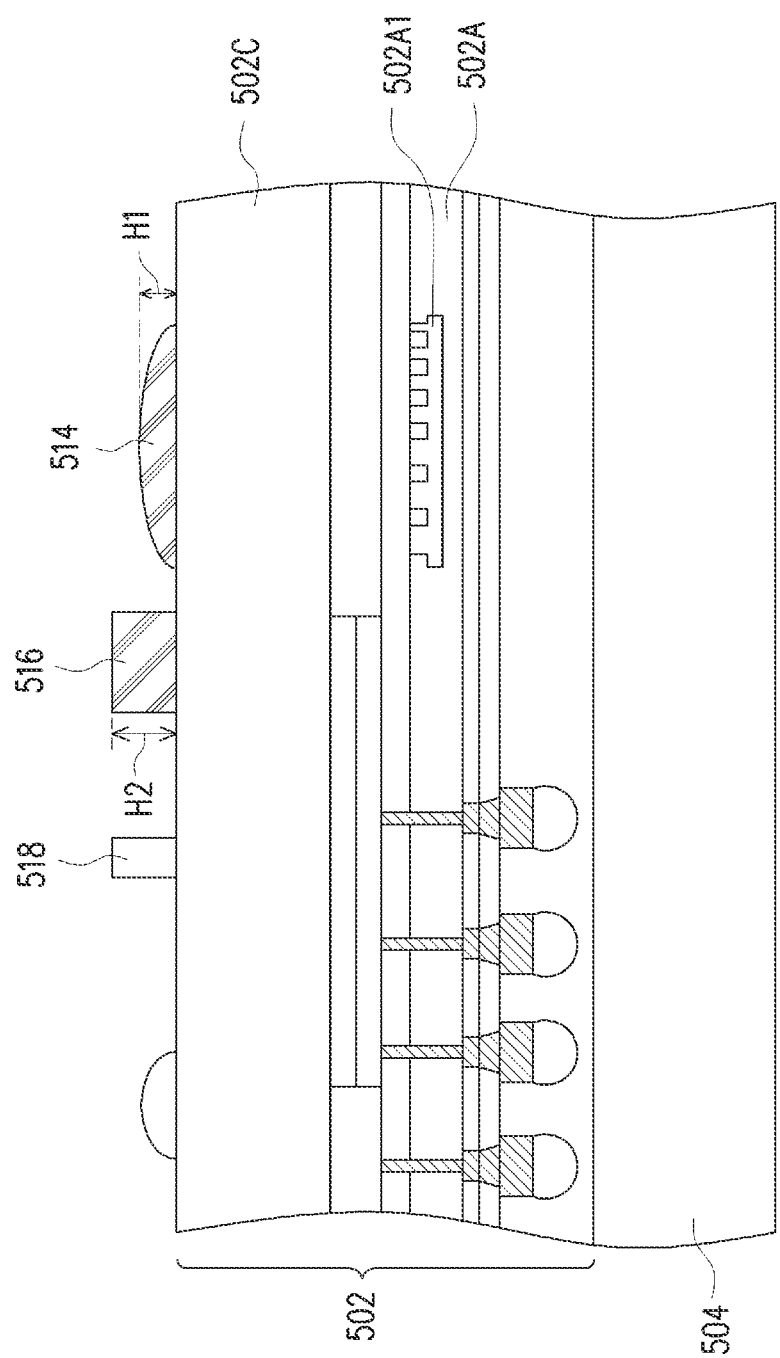

In FIG. 5B, an optical element 514 is formed on the wafer substrate 502C by using a wafer level process and optionally, a raised structure 516 and a dam structure 518 are also formed in the same process of forming the optical element 514. The processing condition of the wafer-level process can be adjusted to form the required shape and size of the optical element 514, the raised structure 516 and the dam structure 518. For example, the optical element 514 can have a lens shape and the optical element 514 is formed above the optical waveguide system 502A1 of the photonic wafer 502A. In some alternative embodiments, the optical element 514 can have a prism shape. In addition, the optical element 514 can have a maximum height H1 smaller than a maximum height H2 of the raised structure 516. The size, the shape and the position of the dame structure 518 can be determined based on the design requirements. In some embodiments, the dam structure 518 and/or the raised structure 516 can be omitted.

Figure 5C:
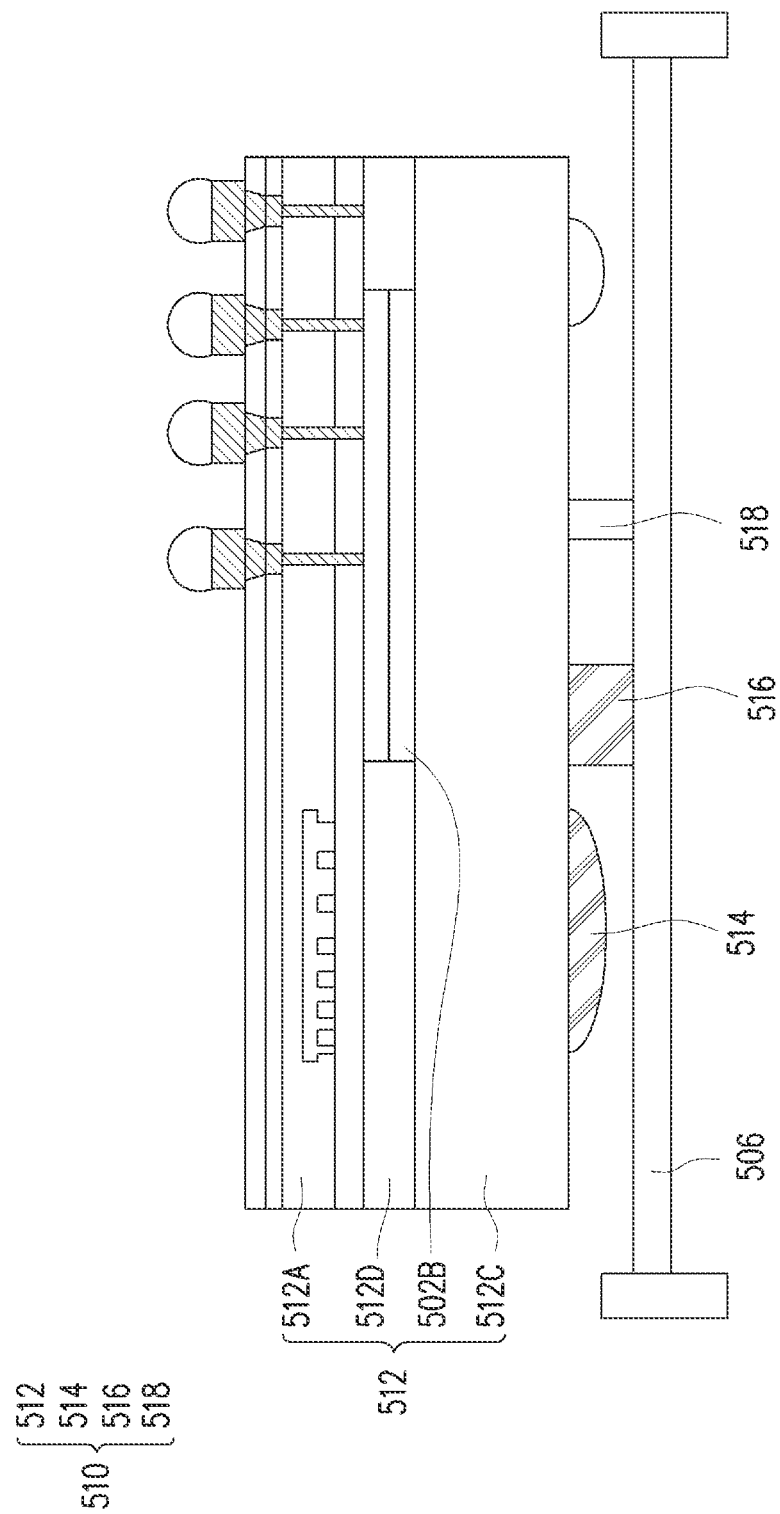

In FIG. 5C, the semiconductor stack structure 502 is separated from the carrier 504, oriented upside down, and placed on the carrier film 506. In addition, a singulation process is performed on the semiconductor stack structure 502 to form a singulated structure 510. The singulated structure 510 includes a die body 512, the optical element 514, the raised structure 516 and the dam structure 518. Specifically, in the die body 512, the photonic wafer 502A is cut into a photonic die 512A, the wafer substrate 502C is cut into a substrate 512C, and the filling layer 502D is cut into a filling layer 512D after the singulation process. The singulation process can include a die saw process.

Figure 5D:
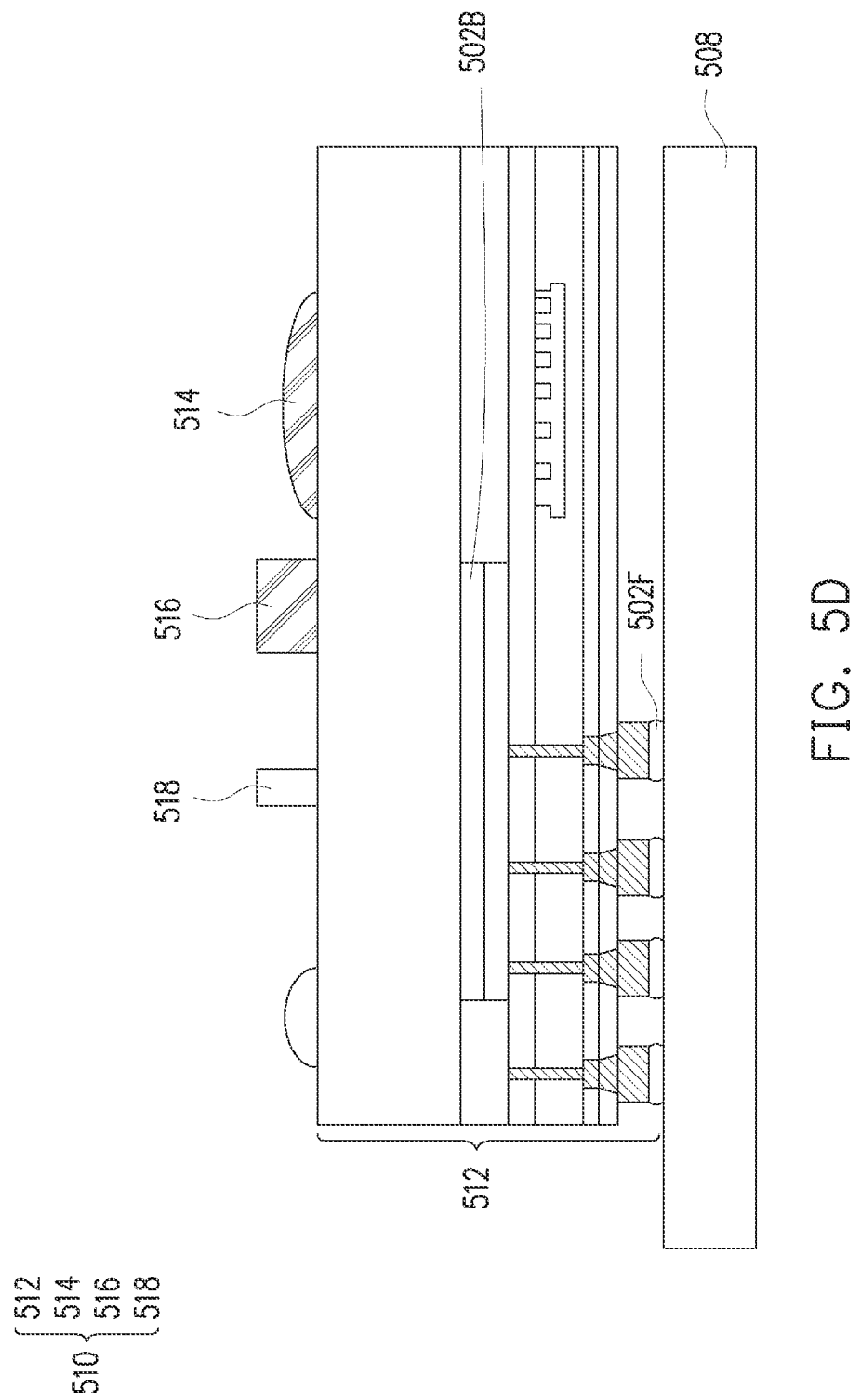

In FIG. 5D, the singulated structure 510 is picked from the carrier film 506 and bonded to a substrate board 508. The substrate board 508 can be a circuit board and the connector 502F on the singulated structure 510 is bonded on the substrate board 508 through a die bonding process. The substrate board 508 can be electrically connected to the electronic die 502B of the singulated structure 510. In FIG. 5E, the singulated structure 510 is covered by a lid 550. The lid 550 is attached to the substrate board 508 and covers a portion of the singulated structure 510. In some embodiments, a thermal interface material 560 can be disposed between the singulated structure 510 and the lid 550. The dam structure 518 is optionally formed to restrict the distribution of the thermal interface material 560. For example, the dam structure 518 may be located at the periphery of the thermal interface material 560. In addition, the raised structure 516 and the optical element 514 are not shielded by the lid 550 and the thermal interface material 560.

Figure 5F:
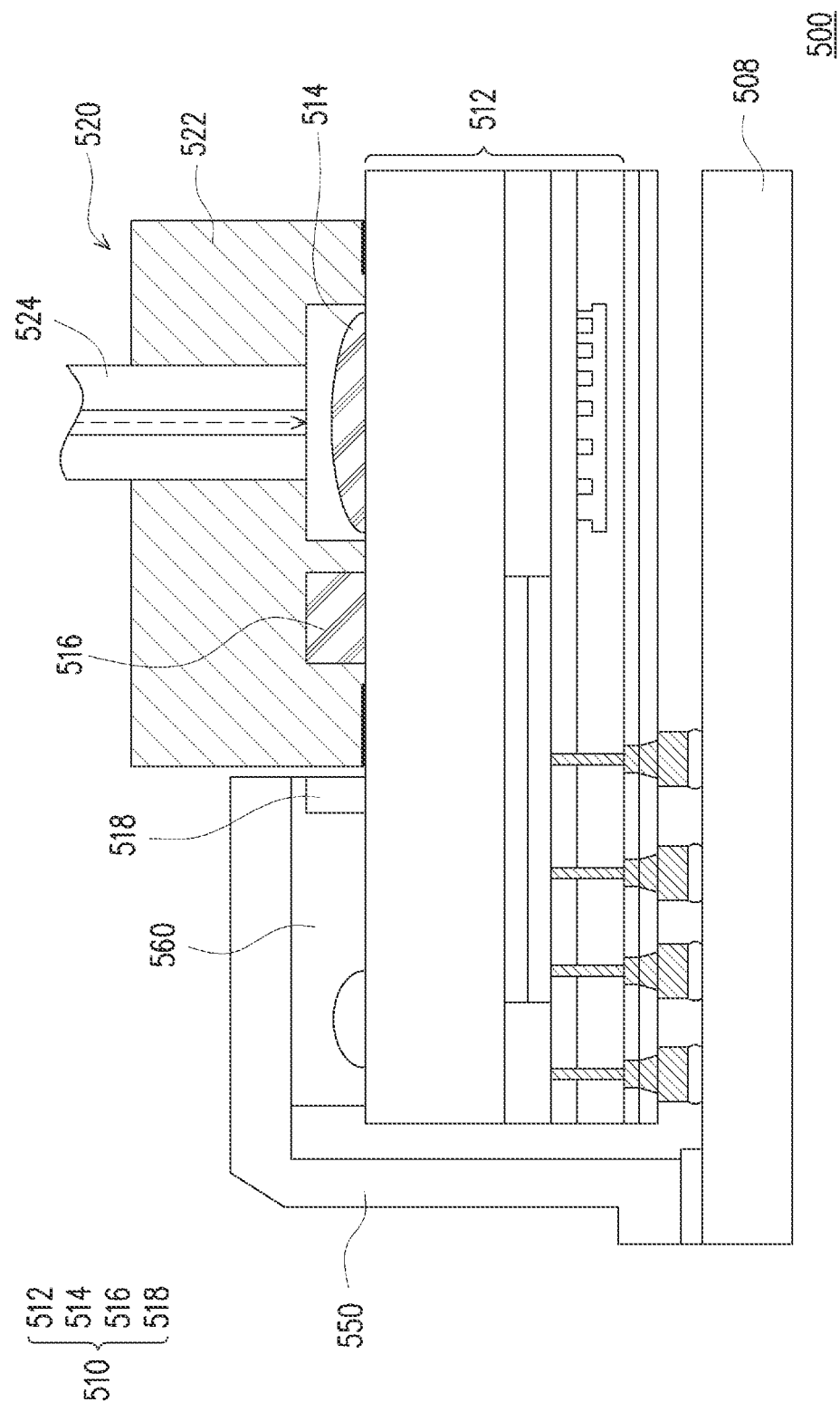

In FIG. 5F, an optical fiber assembly 520 is attached to the singulated structure 510 to obtain a semiconductor device 500. The semiconductor device 500 includes the singulated structure 510 bonded on the substrate board 508, the optical fiber assembly 520 attached to the singulated structure 510, and the lid 550 covering the singulated structure 510. The singulated structure 510 includes the die body 512, the optical element 514 and the raised structure 516. The optical fiber assembly 520 includes a holder 522 and an optical fiber structure 524. The lid 550 is attached to the substrate board 508 and partially covers the die body 512. The lid 550 does not shield the raised structure 516 and the optical element 514 so that the optical fiber assembly 520 is attached on top of the die body 512 and covers the raised structure 516 and the optical element 514.

The fabrication of the semiconductor device 500 depicted in FIG. 5A to FIG. 5E may be considered as an implemental example for fabricating any of the above semiconductor devices 100 to 400. Specifically, the fabricating process of the die body 512 is applicable to fabricate the foregoing die body 112, the fabricating process of the optical element 514 is applicable to fabricate the foregoing optical element 114 as well as the optical element 414 though the optical element 414 has a different shape from the optical element 514, and the fabricating process of the raised structure 516 is applicable to fabricate the foregoing raised structure 116.

Figure 6:
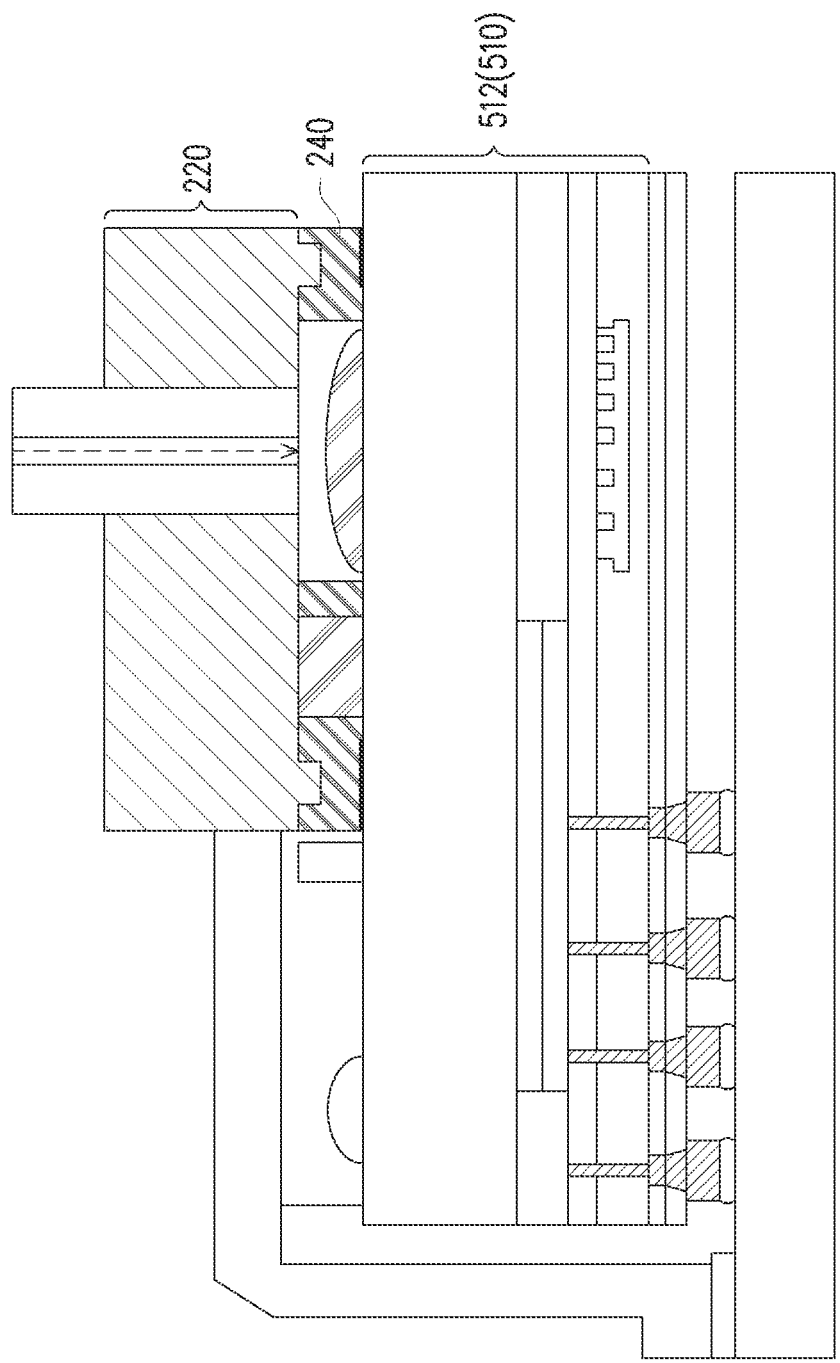
FIG. 6 schematically illustrates a semiconductor device in accordance with some embodiments of the disclosure.
Figure 7:
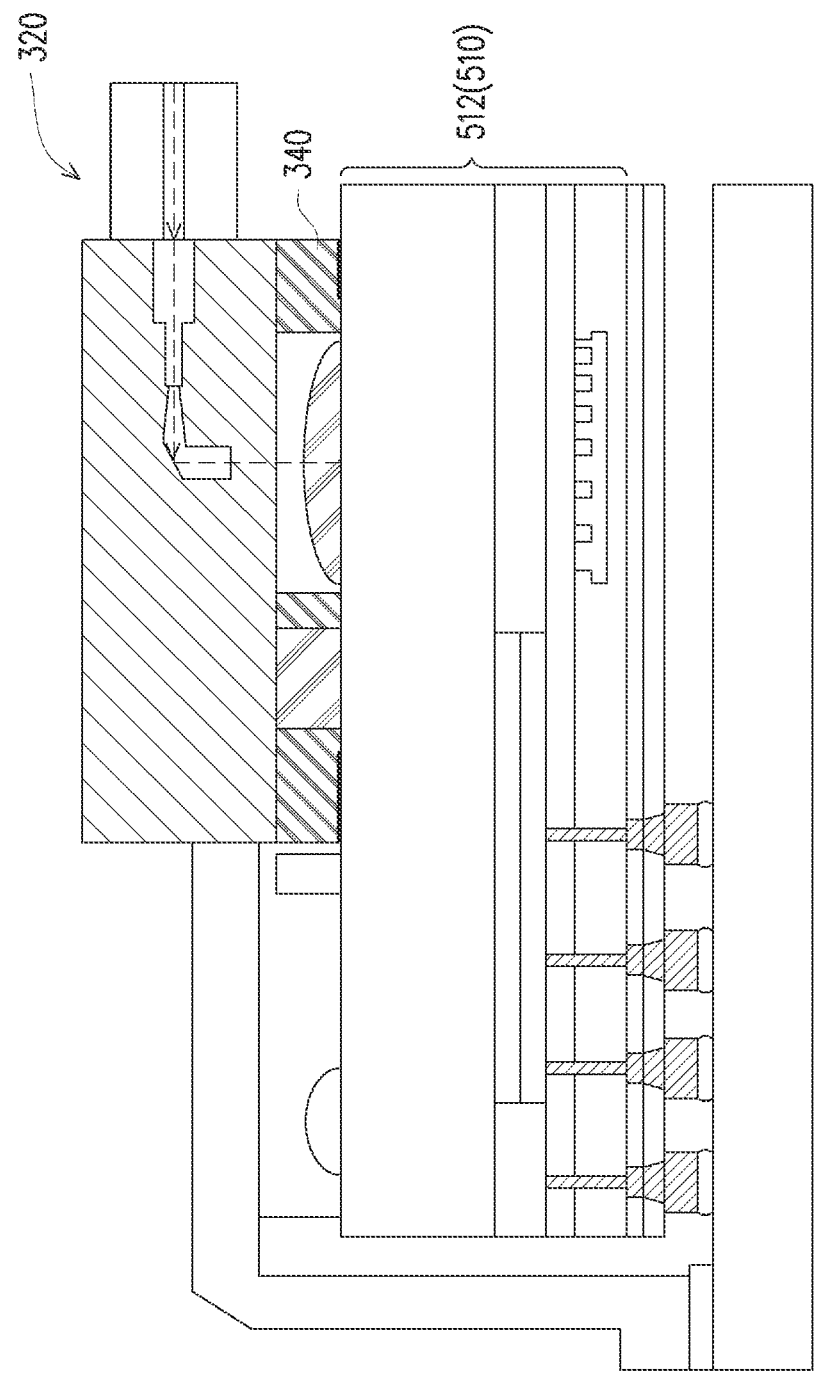
FIG. 7 schematically illustrates a semiconductor device in accordance with some embodiments of the disclosure.
Figure 8:
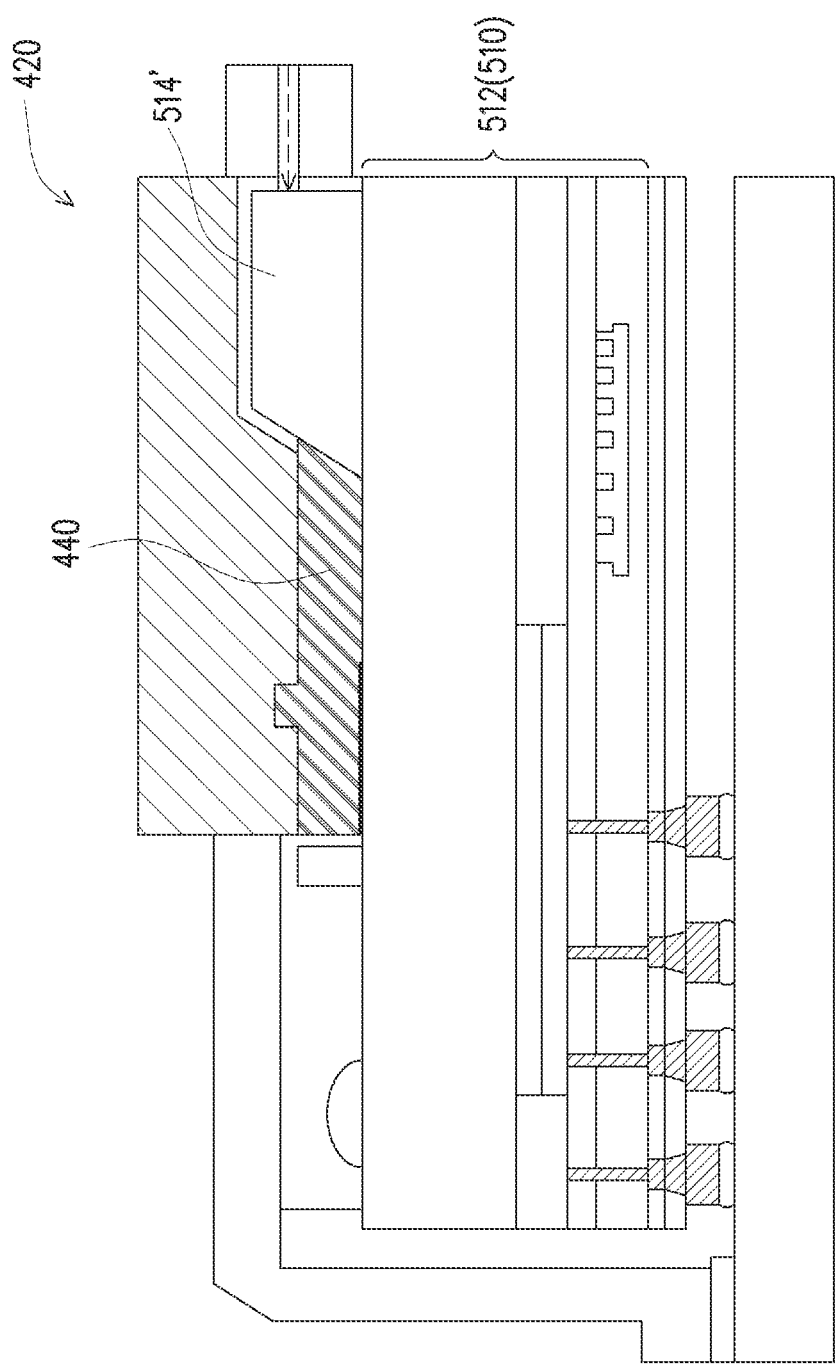
FIG. 8 schematically illustrates a semiconductor device in accordance with some embodiments of the disclosure.

In some embodiments, the optical fiber assembly 520 may be similar to the optical fiber assembly 120. In some embodiments, the optical fiber assembly 220 and the socket 240 shown in FIG. 2B can be attached to the singulated structure 510 to replace the optical fiber assembly 520, as shown in FIG. 6. In some alternative embodiments, the integral piece of the optical fiber assembly 320A and the socket 340A shown in FIG. 3A can be attached to the singulated structure 510 to replace the optical fiber assembly 520, as shown in FIG. 7. In addition, the optical fiber assembly 420 and the socket 440 shown in FIG. 4 can be applicable to the semiconductor device 500 to replace the optical fiber assembly 520, as shown in FIG. 8, and the optical element 514' on top of the singulated structure 510 is a prism.

In the semiconductor device according to some embodiments of the disclosure, the optical fiber assembly is detachable from the singulated structure so that the semiconductor device can be repaired when one or more component of the optical fiber assembly is failed and/or broken. In addition, the semiconductor device includes the guide structure such as the raised structure or the limiting portions for limiting the location of the optical fiber assembly and thus the optical fiber assembly can be arranged corresponding to the optical waveguide system formed in the photonic die of the singulated structure.

In accordance with some embodiments, a semiconductor device includes a singulated structure and an optical fiber assembly. The singulated structure includes a photonic die, an electronic die connected to the photonic die and an optical element over the photonic die. The optical fiber assembly is disposed on a top of the singulated structure and includes a holder and an optical fiber structure. The holder keeps an air gap from the optical element. The optical fiber structure is carried by the holder and configured to be optically communicated with the photonic die through the optical element. A raised structure is further disposed on the singulated structure, and the raised structure is structurally interfered with the optical fiber assembly. A socket is further disposed on the singulated structure, and the holder stacks on the socket. The holder is supported by the socket to keep the air gap from the optical element. The semiconductor device further includes a raised structure disposed on the singulated structure and the socket is structurally interfered with the raised structure. The holder includes a housing and an optical component equipped in the housing. The optical fiber structure is attach to a lateral side of the housing with an optical fiber of the optical fiber structure directs to the optical component. The holder has a through hole directing to the optical element and the optical fiber structure is inserted to the through hole and keep a distance from the optical element.

In accordance with some embodiments, a semiconductor device includes a singulated structure, an optical fiber and a raised structure. The singulated structure comprising a photonic die and an optical element over the photonic die. The optical fiber assembly is disposed on the singulated structure over the optical element and keeps an air gap from the optical element. The raised structure is disposed on the singulated structure and structurally interfered with the optical fiber assembly. A top of the raised structure is leveled higher than a maximum height of the optical element. The raised structure is formed of a material identical to the optical element. The raised structure supports the optical fiber assembly. The singulated structure further includes a guide pin structurally interfered with the raised structure. The optical fiber assembly has a first limiting portion and the raised structure has a second limiting portion structurally interfered with the first limiting portion. One of the first limiting portion and the second limiting portion is a recess and the other of the first limiting portion and the second limiting portion is a protrusion inserted into the recess. The optical fiber assembly includes an optical fiber structure, a holder carrying the optical fiber structure and an optical component equipped in the holder.

In accordance with some embodiments, a semiconductor device includes a singulated structure and an optical fiber assembly. The singulated structure includes a photonic die, an electronic die connected to the photonic die and an optical element over the photonic die. The optical fiber assembly is disposed on a top of the singulated structure. The optical fiber assembly includes a holder detachably attached onto the singulated structure and keeping an air gap from the optical element; and an optical fiber structure carried by the holder and configured to be optically communicated with the photonic die through the optical element. The holder is attached onto the singulated structure through a removable adhesion. A socket is further disposed on the singulated structure between the singulated structure and the optical fiber assembly. The holder has a first limiting portion and the socket has a second limiting portion structurally interfered with the first limiting portion. The optical element is a lens or a prism.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
a singulated structure comprising a photonic die, an electronic die connected to the photonic die and an optical element over the photonic die; and
an optical fiber assembly disposed on a top of the singulated structure and comprising:
a holder keeping an air gap from the optical element; and
an optical fiber structure carried by the holder and configured to be optically communicated with the photonic die through the optical element.

2. The semiconductor device of claim 1, further comprising a raised structure disposed on the singulated structure, wherein the raised structure is structurally interfered with the optical fiber assembly.

3. The semiconductor device of claim 1, further comprising a socket disposed on the singulated structure, and the holder stacks on the socket.

4. The semiconductor device of claim 3, wherein the holder is supported by the socket to keep the air gap from the optical element.

5. The semiconductor device of claim 3, further comprising a raised structure disposed on the singulated structure, wherein the socket is structurally interfered with the raised structure.

6. The semiconductor device of claim 1, wherein the holder comprises a housing and an optical component equipped in the housing, and the optical fiber structure is attach to a lateral side of the housing.

7. The semiconductor device of claim 6, wherein an optical fiber of the optical fiber structure directs to the optical component and the optical component includes an optical prism.

8. The semiconductor device of claim 1, wherein the holder has a through hole directing to the optical element and the optical fiber structure is inserted to the through hole and keep a distance from the optical element.

9. A semiconductor device, comprising:
a singulated structure comprising a photonic die and an optical element over the photonic die;
an optical fiber assembly disposed on the singulated structure over the optical element and keeping an air gap from the optical element; and
a raised structure disposed on the photonic die of the singulated structure and structurally interfered with the optical fiber assembly, wherein a top of the raised structure is leveled higher than a maximum height of the optical element.

10. The semiconductor device of claim 9, wherein the raised structure is formed of a material identical to the optical element.

11. The semiconductor device of claim 9, wherein the raised structure supports the optical fiber assembly.

12. The semiconductor device of claim 11, wherein the singulated structure further comprising a guide pin structurally interfered with the raised structure.

13. The semiconductor device of claim 9, wherein the optical fiber assembly has a first limiting portion and the raised structure has a second limiting portion structurally interfered with the first limiting portion.

14. The semiconductor device of claim 13, wherein one of the first limiting portion and the second limiting portion is a recess and the other of the first limiting portion and the second limiting portion is a protrusion inserted into the recess.

15. The semiconductor device of claim 9, wherein the optical fiber assembly comprises an optical fiber structure, a holder carrying the optical fiber structure and an optical component equipped in the holder.

16. A semiconductor device, comprising:
a singulated structure comprising a photonic die, an electronic die connected to the photonic die and an optical element over the photonic die; and an optical fiber assembly disposed on a top of the singulated structure and comprising:
  a holder detachably attached onto the singulated structure and keeping an air gap from the optical element; and
  an optical fiber structure carried by the holder and configured to be optically communicated with the photonic die through the optical element.

17. The semiconductor device of claim 16, wherein the holder is attached onto the singulated structure through a removable adhesion.

18. The semiconductor device of claim 16, further comprising a socket disposed on the singulated structure between the singulated structure and the optical fiber assembly.

19. The semiconductor device of claim 18, wherein the holder has a first limiting portion and the socket has a second limiting portion structurally interfered with the first limiting portion.

20. The semiconductor device of claim 16, wherein the optical element is a lens or a prism.

* * * * *